US006809154B2

(12) United States Patent
Lindahl et al.

(10) Patent No.: US 6,809,154 B2
(45) Date of Patent: Oct. 26, 2004

(54) HDPE POLYMER COMPOSTION

(75) Inventors: Ann Kristen Lindahl, Porsgronn (NO); Harry Oysaed, Stathelle (NO); Roger Goris, Singapore (SG)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/257,498

(22) PCT Filed: Apr. 5, 2001

(86) PCT No.: PCT/EP01/03908

§ 371 (c)(1), (2), (4) Date: Feb. 6, 2003

(87) PCT Pub. No.: WO01/79344

PCT Pub. Date: Oct. 25, 2001

(65) Prior Publication Data

US 2003/0153688 A1 Aug. 14, 2003

(30) Foreign Application Priority Data

Apr. 13, 2000 (EP) .............................. 00108174

(51) Int. Cl.⁷ ............................ C08L 23/04; C08L 23/06
(52) U.S. Cl. ........................ 525/191; 525/216; 525/240
(58) Field of Search ................................ 525/191, 216, 525/240

(56) References Cited

U.S. PATENT DOCUMENTS

| | | | | |
|---|---|---|---|---|
| 4,588,775 | A | * 5/1986 | McCullough, Jr. | ........... 525/88 |
| 5,494,965 | A | 2/1996 | Harlin et al. | |
| 5,530,055 | A | * 6/1996 | Needham | ..................... 524/528 |
| 6,221,982 | B1 | * 4/2001 | Debras et al. | ................. 526/64 |
| 6,291,601 | B1 | * 9/2001 | Debras | ......................... 526/64 |
| 6,632,896 | B1 | * 10/2003 | Almquist et al. | ............. 526/96 |
| 6,642,323 | B1 | * 11/2003 | Myhre et al. | .................. 526/64 |

FOREIGN PATENT DOCUMENTS

| | | |
|---|---|---|
| EP | 0 423 962 A | 4/1991 |
| GB | 2 141 719 A | 1/1985 |

OTHER PUBLICATIONS

Iroh, J.O. et al., *Mechanical Properties of Nucleated Polypropylene and Short Glass Fiber–Polypropylene Composites, Eur. Polym. J.* vol. 32, No. 12, pp. 1425–1429, 1996.
International Search Reporting corresponding to International Application No. PCT/EP01/03908.

\* cited by examiner

Primary Examiner—Nathan M. Nutter
(74) Attorney, Agent, or Firm—Fay, Sharpe, Fagan, Minnich & McKee, LLP

(57) ABSTRACT

HDPE compositions comprising a bimodal polymer and a nucleating agent, for producing moulded articles with increased E-modulus and high ESCR, and the use of such compositions in the production of moulded articles.

31 Claims, 1 Drawing Sheet

HDPE POLYMER COMPOSTION

Figure 1:
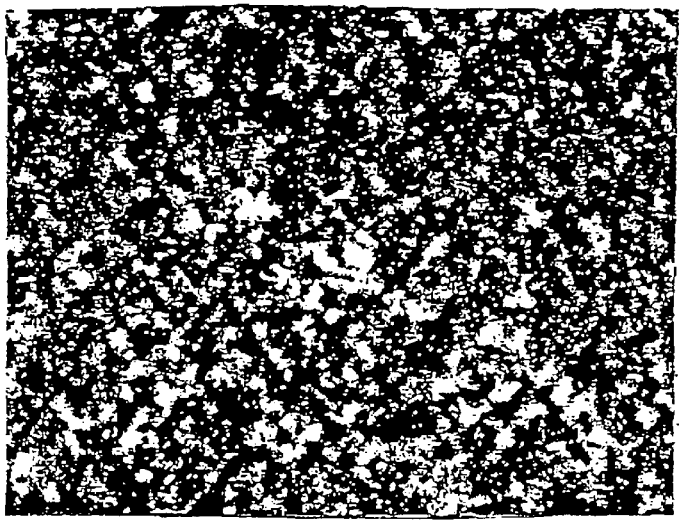

This invention relates to high density polyethylene (HDPE) compositions and to their use in the production of moulded articles.

Monomodal HDPE, produced by the use of Ziegler-Natta or chromium-based catalysts, is a well known material for the production of articles such as packaging or containers by injection- and blow-moulding.

It is important that such articles be resistant to stress-cracking, since they are frequently used to contain materials whose uncontrolled release would be environmentally undesirable. The assessing of such resistance is by the Environmental Stress Crack Resistance test ("ESCR"), the procedure for which is laid down in ASTM D 1693. Cond. B.

It is also important that they possess good stiffness, so as not to deform when stacked during transportation or storage. Stiffness in this context is expressed as Tensile Modulus (also referred to as "E-modulus"), the procedure for assessing which is laid down in ISO 527-2.

It has not proved possible with existing HDPE formulations to achieve both adequate stiffness and adequate ESCR in demanding applications such as manufacture of bottles for detergents. Increasing the density of the HDPE has been found to increase the stiffness, but only at the expense of decreasing the ESCR.

It has now been found that by using bimodal HDPE in such formulations and adding a nucleating agent to the polymer there may be obtained an HDPE moulding composition of increased stiffness and undiminished ESCR.

According to the present invention, therefore, an HDPE composition for producing moulded articles with increased E-modulus and high ESCR comprises an ethylene homopolymer or an ethylene alpha-olefin copolymer which is a bimodal polymer produced in a multistage process and comprising i) a low molecular weight ethylene polymer and
ii) a high molecular weight ethylene polymer or copolymer and a nucleating agent.

The effectiveness of the nucleation is surprising, since although nucleation has been widely practised in manufacturing polypropylene-based compositions this has not been the case with polyethylene because it is inherently such a rapidly crystallizing polymer. The effect of nucleation on bimodal HDPE could therefore not have been foreseen.

The alpha-olefin of the aforesaid ethylene alpha-olefin copolymer is suitably selected -from propylene, 1-butene, 1-pentene, 1-hexene, 4-methyl-1-pentene, 1-octene, 1-decene and cyclic olefins, its content being typically between 0.1 and 10 weight %. The density of the composition is preferably between 910 and 980 kg/m$^3$, more preferably between 945 and 975 kg/m$^3$, while its melt index MFR$_{21.6}$, measured at 190° C. under 21.6 kg load, is preferably between 1 and 1000 g/10 min.

Different ranges of melt index within this range may be selected for particular applications. Thus for manufacture of household and industrial containers MFR$_{21.6}$ is advantageously between 15 and 50; for injection moulding it should be between 120 and 770; and for manufacture of large cans an MFR$_{21.6}$ between 1 and 10 is appropriate.

The overall composition suitably comprises 5–95% of the low molecular weight ethylene polymer or copolymer and 95–5% of the high molecular weight ethylene polymer, preferably 30–70% of the former and 70–30% of the latter. Its number average molecular weight M$_n$ is suitably between 1,000 and 20,000 g/mole, while its weight average molecular weight M$_w$ is suitably between 50,000 and 500,000 g/mole. Its polydispersity index M$_w$/M$_n$ is generally between 5 and 75, although for injection moulding applications it is preferably between 10 and 20, whilst for blow moulding applications it is preferably between 20 and 60.

The most effective nucleating agents are those containing an organic group and a polar group and which are insoluble in the HDPE, such as mono- or polycarboxylic aromatic acids or salts thereof A particularly effective nucleating agent is sodium benzoate. The nucleating agent is usually present in an amount of between 1 and 10,000 ppm, advantageously between 10 and 5000 ppm; preferably between 50 and 2000 ppm, and in certain favoured embodiments between 400 and 1200 ppm.

The HDPE according to the invention is a bimodal or even multimodal polymer. By "bimodal" is meant that the polymer comprises at least two components, one of which has a relatively low molecular weight and a relatively high density and another of which has a relatively high molecular weight and a relatively low density. Typically the molecular weight distribution (MWD) of a polymer produced in a single polymerization stage using a single monomer mixture, a single polymerization catalyst and a single set of process conditions will show a single maximum, the breadth of which will depend on catalyst choice, reactor choice, process conditions, etc; i.e. such a polymer will be monomodal.

The bimodal (or multimodal) polyethylene is produced by polymerization using conditions which create a bimodal or multimodal polymer product, eg using a catalyst system or mixture with two or more different catalytic sites, using two or more stage polymerization processes with different process conditions in the different stages (eg different temperatures, pressures, polymerization media, hydrogen partial pressures, etc).

Such bimodal (or multimodal) HDPE may be produced relatively simply by a multistage ethylene polymerization, eg using a series of reactors, with comonomer addition in only the reactor(s) used for production of the higher/highest molecular weight component(s). Examples of bimodal PE production are given in EP-A-778,289 and WO92/12182.

If an ethylene homopolymer component is produced by slurry polymerization involving use of recycled diluent, that diluent may contain small amounts of higher α-olefins as contaminants. Likewise where an earlier polymerization stage has produced an ethylene copolymer component, small amounts of comonomer may be carried over to an ethylene homopolymerization stage. Accordingly, by ethylene homopolymer is meant herein a polymer preferably containing at least 99.9% by weight of ethylene units. Likewise as in a multistage/multireactor polymerization using more than one catalyst system, the homopolymerization catalysts may be at least partially active during the copolymerization reaction, any copolymer component making up less than 5% by weight of the total polymer shall not be considered to be the lowest molecular weight component in an HDPE according to the invention.

The polymerization reactions used to produce the HDPE of the invention may involve conventional ethylene homopolymerization or copolymerization reactions, eg gasphase, slurry phase, liquid phase polymerizations, using conventional reactors, eg loop reactors, gas phase reactors, batch reactors etc. (see for example WO97/44371 and WO96/18662). The catalyst systems used may likewise be any conventional systems, eg chromium catalysts, Ziegler-Natta and metallocene or metallocene:aluminoxane catalysts, either homogeneous or more preferably heterogeneous catalysts, eg catalysts supported on inorganic or organic particulates, in particular on magnesium halides or inorganic oxides such as silica, alumina or silica-alumina. For the preparation of the high molecular weight component in particular it is especially desirable to use supported Ziegler-Natta catalyst as the molecular weight can then conveniently be controlled using hydrogen. It is also possible to use supported metallocene catalysts as it is particularly straightforward to select desired molecular weights by appropriate selection of particular metallocenes. The metallocenes used will typically be group IVa to VIa metals (in particular Zr or Hf) complexed by optionally substituted cyclopentadienyl groups, eg groups carrying pendant or fused substituents optionally linked together by bridging groups. Suitable metallocenes and aluminoxane cocatalysts are widely described in the literature, eg the patent publications of Borealis, Hoechst, Exxon, etc.

Typically however the HDPE will be prepared using multistage polymerization using a single catalyst system or a plurality of catalyst systems, eg two or more metallocenes, one or more metallocenes and one or more Ziegler-Natta catalysts, two or more chromium catalysts, one or more chromium catalysts and one or more Ziegler-Natta catalysts, etc.

In a particularly contemplated embodiment the HDPE is produced by a process comprising catalytically polymerizing or copolymerizing ethylene in the liquid phase in an inert hydrocarbon medium in a loop reactor, passing the polymer product from the loop reactor to a gas phase reactor and there continuing the polymerization in the presence of ethylene, optionally with further catalyst, to obtain a bimodal product of which said polymer from the loop reactor constitutes 20–90% weight. A prepolymerization step may precede the loop reactor, in which step ethylene homopolymer is produced by liquid phase polymerization in the presence of polymerization catalyst, hydrogen and a diluent, the homopolymer produced, amounting to 1 to 5% by weight of final HDPE product, being then passed to the loop reactor together with said polymerization catalyst, optionally with no further addition of catalyst. Typically the polymerization in the loop reactor is homopolymerization of ethylene and the polymerization in the gas phase reactor is copolymerization of ethylene with an alpha-olefin selected from propylene, 1-butene, 1-pentene, 1-hexene, 4-methyl-1-pentene, 1-octene, 1-decene and cyclic olefins.

The low molecular weight ethylene polymer forming one component of the final bimodal polymer preferably has a weight average molecular weight of between 5,000 and 50,000 g/mole, and a melt index $MER_2$ measured under 2.16 kg load of between 50 and 2,000 g/10 mm, a comonomer content of less than 2 mole % and a density between 960 and 980 kg/m$^3$.

The high molecular weight ethylene polymer or copolymer forming the other component suitably has a weight average molecular weight of between 300,000 and 1,000,000 g/mole and a comonomer content of 0. 1–10, preferably 0.1–0.3, % wt.

A favoured polymerization catalyst for use in the above-described embodiment comprises an inorganic support carrying a chlorine compound, a magnesium compound and a titanium compound. Such catalysts and their preparation are described in detail in EP-A-688,794, the relevant content of which is incorporated herein by reference.

The invention further comprehends the use of a bimodal HDPE composition comprising i) a low molecular weight ethylene polymer, ii) a high molecular weight ethylene polymer or copolymer; and iii) a nucleating agent;

for producing moulded articles with increased E-modulus and high ESCR.

The nucleating agent may be introduced into the polymer composition by kneading a mixture of the polymer, usually in powder or pellet form, with the nucleating agent, which may be utilized alone or in the form of a master batch containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm).

Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Preferred for use in the present invention is sodium benzoate. Effectiveness of nucleation can be monitored microscopically by observation of the degree of reduction in size of the spherulites into which the crystallites are aggregated.

The invention is illustrated by the following Examples.

EXAMPLE 1

A bimodal polyethylene was prepared by a two-step process, in which the first step consisted of a loop polymerization and the second step consisted of a gas phase polymerization. Ethylene (27 kg/hr) and hydrogen (96 g/hr) were fed to the loop reactor; ethylene (41 kg/hr), 1-butene (1.2 kg/hr) and hydrogen (46 g/hr) were fed to the gas phase reactor. As a catalyst a Ziegler-Natta catalyst was used prepared according to EP-A-688,794 using Al-alkyl as cocatalyst. The catalyst was fed only into the loop reactor.

The polymerization conditions were the following:

| Loop reactor | |
| --- | --- |
| Reactor temperature | 95° C. |
| Reactor pressure | 65 bar |
| Ethylene feed rate | 35–40 kg/h |
| Hydrogen feed rate | 50–60 g/h |
| Medium (diluent) | propane |
| Gas phase reactor | |
| Reactor temperature | 75° C. |
| Reactor pressure | 20 bar |
| Ethylene feed rate | 50–60 kg/h |
| Hydrogen feed rate | 15–20 g/h |
| Comonomer feed rate | 2,8 kg/h |

The polymer fraction produced in the loop reactor having a high density (975 kg/m$^3$) and a high melt flow (MFR$_2$= 300) was introduced into a gas phase reactor in which the polymerization was continued for manufacturing bimodal product. 1 -Butene was added into gas phase reactor as comonomer. The ratio between the components produced in the loop reactor and in the gas phase reactor was 45:55. The bimodal polyethylene obtained had the following properties:

| | |
| --- | --- |
| MFR$_5$ | 1.8 |
| MFR$_{21}$ | 28 |
| FFR$_{21/5}$ | 19 |

-continued

| | |
|---|---|
| $M_w$ | 190,000 |
| $M_w/M_n$ | 20 |
| Density | 958 kg/m$^3$ |
| Comonomer content | about 0.2% wt. |

This product in powder form was then thoroughly mixed in an extruder with micronised sodium benzoate having the particle size distribution:

| <µm | % |
|---|---|
| 2 | 40–70 |
| 8 | 90–95 |
| 20 | 99–100 | to produce compositions having sodium benzoate contents of 500 and 1000 ppm. Samples of these two compositions, and of a reference composition containing no sodium benzoate, were tested according to ASTM D 1693 for ESCR (Antarox 10%) and according to ISO 527-2 for Tensile Modulus (E-modulus). The results were:

| | Reference | 500 ppm Na benzoate | 1000 ppm Na benzoate |
|---|---|---|---|
| E-modulus (MPa) | 1290 | 1330 | 1340 |
| ESCR (10%) F50(h) | 105 | 116 | 106 |

EXAMPLE 2

Similar tests run on further batch of the product of Example 1 gave the following results:

| | Reference | 500 ppm Na benzoate | 1000 ppm Na benzoate |
|---|---|---|---|
| E-modulus (MPa) | 1250 | 1250 | 1290 |
| ESCR (10%) F50(h) | 87 | 92 | 101 |

Figure 2:
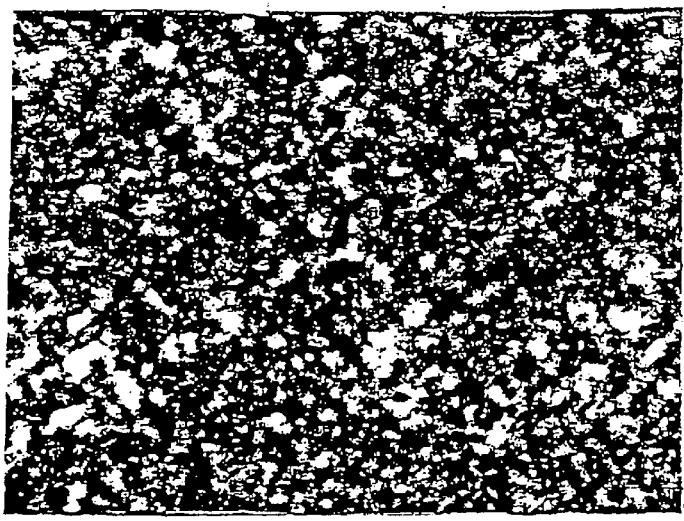
Figure 3:
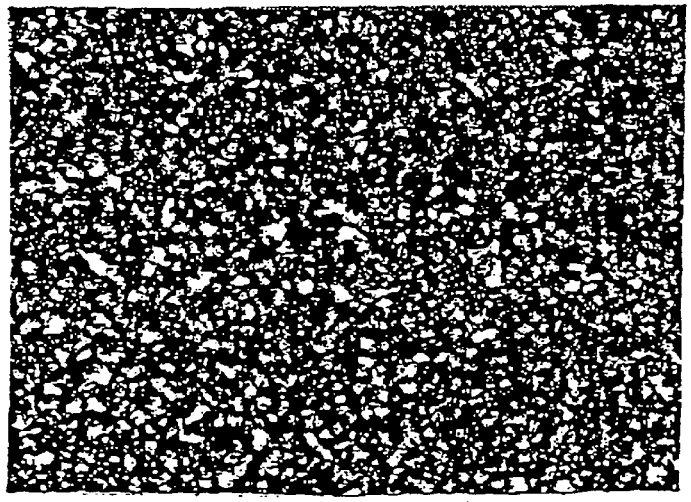

Photomicrographs of the three samples tested in Example 1 at 500× magnification are reproduced in FIGS. 1 (reference), 2 (500 ppm Na benzoate) and 3 (1000 ppm Na benzoate). Comparison of FIGS. 1 and 2 reveals that the addition of 500 ppm of sodium benzoate has caused a slight increase in the proportion of smaller spherulites, while FIG. 3 reveals the complete elimination of the large spherulites which dominate in FIG. 1.

What is claimed is:

1. An HDPE composition comprising an ethylene homopolymer or an ethylene alpha-olefin copolymer for producing moulded articles with increased E-modulus and high ESCR, wherein the polymer is a bimodal polymer produced in a multistage process comprising
   i) a low molecular weight ethylene polymer and
   ii) a high molecular weight ethylene polymer or copolymer and a nucleating agent.

2. A HDPE composition according to claim 1, characterized in that the alpha-olefin of the ethylene alpha-olefin copolymer is selected from propylene, 1-butene, 1-pentene, 1-hexene, 4-methyl-1-pentene, 1-octene, 1-decene and cyclic olefins.

3. A HDPE composition according to claim 1, characterized in that the alpha-olefin comonomer content is between 0.1 and 10 weight %.

4. A HDPE composition according to claim 1, characterized in that the density is between 910 and 980 kg/m$^3$.

5. A HDPE composition according to claim 4, characterized in that the density is between 945 and 975 kg/m$^3$.

6. A HDPE composition according to claim 1, characterized in that the melt index $MFR_{21.6}$ measured at 190° C. under 21.6 kg load is between 1 and 1000 g/10 min.

7. A HDPE composition according to claim 6 wherein $MFR_{21.6}$ is between 15 and 50.

8. A HDPE composition according to claim 6 wherein $MFR_{21.6}$ is between 120 and 770.

9. A HDPE composition according to claim 6 wherein $MFR_{21.6}$ is between 1 and 10.

10. A HDPE composition according to claim 1 characterized in that the polymer composition comprises 5–95% of said low molecular weight ethylene polymer and 95–5% of said high molecular weight ethylene polymer or copolymer.

11. A HDPE composition according to claim 10, characterized in that the polymer composition comprises 30–70% of said low molecular weight ethylene polymer and 70–30% of said high molecular weight ethylene polymer or copolymer.

12. A HDPE composition according to claim 1, characterized in that the weight average molecular weight $M_w$ is between 50,000 and 20,000 g/mole.

13. A HDPE composition according to claim 1, characterized in that the weight average molecular weight $M_w$ is between 50,000 and 500,000 g/mole.

14. A HDPE composition according to claim 1, characterized in that the polydispersity index $M_w/M_n$ is between 5 and 75.

15. A HDPE composition according to claim 14 wherein $M_w/M_n$ is between 10 and 20.

16. A HDPE A composition according to claim 14 wherein $M_w/M_n$ is between 20 and 60.

17. A HDPE composition according to claim 1 wherein the nucleating agent contains an organic group and a polar group and is insoluble in the HDPE.

18. A HDPE composition according to claim 17 where in the nucleating agent is a mono- or polycarboxylic aromatic acid or a salt thereof.

19. A HDPE composition according to claim 18 wherein the nucleating agent is sodium benzoate.

20. An HDPE composition according to claim 1, characterized in that the nucleating agent is present in an amount of between 1 and 10,000 ppm.

21. A HDPE composition according to claim 20 wherein the amount of nucleating agent is between 10 and 5000 ppm.

22. A HDPE composition according to claim 21 wherein the amount of nucleating agent is between 50 and 2000 ppm.

23. A HDPE composition according to claim 22 wherein the amount of nucleating agent is between 400 and 1200 ppm.

24. A HDPE composition according to claim 1 wherein the HDPE has been produced by a process comprising catalytically homopolymerizing ethylene in the liquid phase in an inert hydrocarbon medium in a loop reactor, passing the polymer product from the loop reactor to a gas phase reactor and there continuing the polymerization in the presence of ethylene and further catalyst to obtain a bimodal product of which said polymer from the loop reactor constitutes 20–90% weight.

25. A HDPE composition according to claim 24 wherein said process further comprises a prepolymerization step which precedes the loop reactor and in which ethylene homopolymer is produced by liquid phase polymerization in the presence of polymerization catalyst, hydrogen and a diluent, the homopolymer produced, amounting to 1 to 5% by weight of final HDPE product, being then passed to the loop reactor together with said polymerization catalyst.

26. A HDPE composition according to claim 24 wherein the polymerization in the gas phase reactor is copolymerization of ethylene with an alpha-olefin selected from propylene, 1-butene, 1-pentene, 1-hexene, 4-methyl-1-pentene, 1-octene, 1-decene and cyclic olefins.

27. A HDPE composition according to claim 1, characterized in that the low molecular weight ethylene polymer has a weight average molecular weight of between 5000 and 50,000 g/mole.

28. A HDPE composition according to claim 1, characterized in that the low molecular weight ethylene polymer has a melt index $MFR_2$ measured under 2.16 kg load of between 50 and 2,000 g/10 min.

29. A composition according to any preceding claim characterized in that the low molecular weight ethylene polymer has a density between 960 and 980 kg/m$^3$.

30. A composition according to claim 1, characterized in that the high molecular weight ethylene polymer has a weight average molecular weight of between 300,000 and 1,000,000 g/mole.

31. A composition according to claim 1, characterized in that the high molecular weight ethylene copolymer has a comonomer content of 0.7 to 7.0 mole%.

* * * * *